Jan. 23, 1962 T. H. RICHARDS 3,017,820
EGG POACHER
Filed Nov. 2, 1959

INVENTOR.
THOMAS H. RICHARDS 3,017,820
EGG POACHER
Thomas Henry Richards, Blenheim, Ontario, Canada
(1780 Grand Marais W., Windsor, Ontario, Canada)
Filed Nov. 2, 1959, Ser. No. 850,292
3 Claims. (Cl. 99—436)

This invention relates to a device for poaching eggs.

The object of the invention is to provide an egg poacher constructed to poach a plurality of eggs in a single operation in a very convenient way. The parts employed are of such nature that they may be easily assembled for the carrying out of the poaching operation and easily disassembled for such easy and thorough cleaning as will maintain the egg poacher in a sanitary condition.

Figure 1:
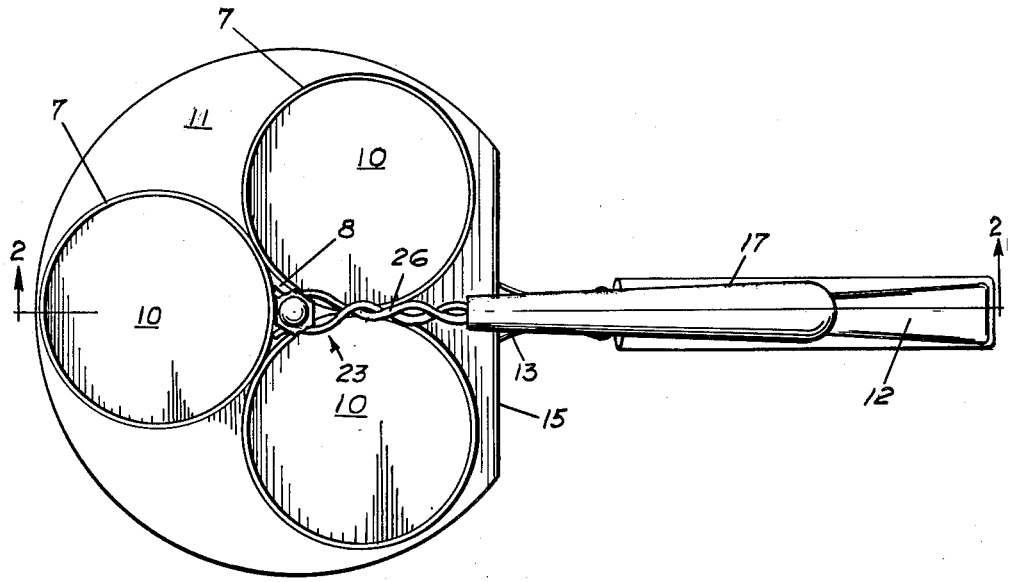
Figure 2:
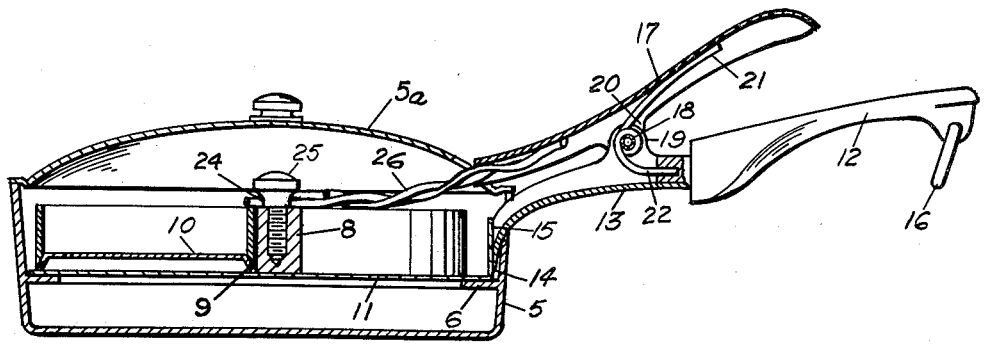

The way in which the foregoing objects are attained will be best understood from an inspection of the accompanying drawing, in which:

FIG. 1 is a plan view of the ring mold assembly of an egg poacher, constructed in accordance with the invention, and FIG. 2 is a vertical sectional view therethrough upon line 2—2 of FIG. 1.

Like numerals designate corresponding parts in all of the figures of the drawing.

The egg poacher of the invention comprises a water receiving pan 5, having an internal flange or ledge 6, extending, around its inner face, said flange serving to support the egg carrying element of the device in properly spaced relation to the bottom of the pan.

Since water receiving pans adapted to support egg carrying elements are well known it is to be understood that the features of novelty and advantages of the invention reside primarily in the egg carrying portion of the device. This egg carrying portion comprises a plurality of open bottom, pocket forming rings, 7. I have shown three of said rings, though the number may be varied. The three rings are united as a ring mold assembly to move together, by being secured to a plate or block 8. The lower edges of the open rings fit over and snugly engage the sloping or beveled walls 9 of raised bosses 10, said bosses upstanding from the upper face of a base plate 11. A handle for manipulating the base plate in placing said plate in the water pan and removing it therefrom, comprises a relatively wide, outer, hand grasp portion 12, and an inner shank 13, the outer end of which shank enters and is rigidly affixed in the portion 12. The inner end portion of the shank is rigidly affixed at 14, by riveting or otherwise to an upstanding edge wall 15 of base plate 11. The hand grasp portion may be of wood, hard rubber or any other material that is non-retentive of heat and it may carry a conventional loop 16 by which the egg carrying portion may be hung upon a hook or nail.

The three rings 7 and the plate 8 which unites them constitute a ring assembly which may be lifted, as a whole, from the bosses 10 by a curved lifting and tensioning lever 17. This lever is pivotally mounted upon handle shank 13 by means of a pivot pin 18 said pivot pin passing through upturned ears 19 of shank 13 and downturned ears 20 of lifting and tensioning lever 17. The coiled body portion of a stout helical spring is mounted on pivot pin 18 and extended ends 21 and 22 of said spring bear against the under side of lever 17 and the shank 13 of the manipulating handle, in such manner that said spring acts to exert a very firm pressure of the rings of the ring assembly upon the beveled faces 9 of bosses 10. This is effected through the engagement of a fork 23 that is mounted upon the end of lever 17, with the reduced intermediate portion 24 of a headed stem 25 which upstands from the top of plate 8. Fork 23 may be made in any suitable way but it is important that it not only serve to lift the ring assembly when lever 17 is depressed against the tension of the spring, but that its connection with the ring assembly be a quickly detachable one. To that end the fork, in the particular form shown, is made of a pair of stout wires twisted together to provide a reasonably rigid body portion 26 but flaring apart at their outer ends to render the fork an open mouth fork, into which the reduced portion 24 of stem 25 may readily snap when the ring assembly is to be engaged with lever 17. A mere pull upon the ring assembly away from lever 17 will, with equal facility, disengage the ring assembly from lever 17.

When thus assembled all parts of the egg carrying assembly are rendered completely accessible for thorough cleaning.

It is well recognized that the primary requisite of an acceptable egg poacher is that it comprise a pocket or pockets for the reception of the egg and that such pocket should be of a nature to maintain the complete egg including the white and yolk portion thereof, in proper form and shape during the cooking operation. It is therefore important that the pocket be of such nature as to prevent undesirable leakage of the egg content therefrom until such egg content solidifies. My improved structure effectively secures the foregoing results by imposing the described spring loading upon the open bottom rings, to a degree to effect the necessary tight engagement of the lower edges of the rings upon the beveled faces of the bosses as described. To further facilitate this action I may make the rings of plastic and of such degree of bendability and elasticity as to cause them to seek a very exact fitting about the bosses 10. From the foregoing description it will be seen that I have provided an egg poacher of such nature that a plurality of eggs may be poached at one time, that the pocket forming rings about all of the poached eggs may be removed with a single movement of an operating handle or lever and that the elements utilized in accomplishing the foregoing results are of great simplicity, are of low cost and are arranged for such quick assembly and disassembly that the task of maintaining the whole in a clean and sanitary condition is rendered very light. In use base plate 11 will be supported upon ledge or flange 6 of the water receiving pan 5. This pan may have a cover or lid 5a and the lid and pan may be notched as indicated for the reception of shank 13 and the lever 17.

It is to be understood that the invention is not limited to the particular form shown, but that it includes within its purview whatever changes fairly fall within either the terms or the spiirt of the appended claims.

I claim:

1. An egg carrying assembly comprising a base plate, a plurality of bosses upstanding from the face of the base plate, said bosses being of circular form and having beveled edges extending substantially throughout the height thereof, and entirely therearound, a ring mold assembly consisting of a plurality of open bottom elastic rings, a central uniting member by which said rings are united, said rings corresponding in number to the bosses and being of such diameter that the lower edges of said rings engage the beveled edge portions of the bosses at points intermediate the tops and bottoms of said beveled edge portions, a handle carried by and projecting outwardly from the base plate, a spring actuated member carried by said handle and interengaging connections between the spring actuated member and the central uniting member through which the spring actuated member causes the elastic rings to forcibly engage the said beveled edges of the bosses.

2. A structure as recited in claim 1 wherein said spring actuated member is in the form of an elongated lever that is pivoted intermediate its ends upon the upper side of the handle, that portion of said lever which lies inwardly of its pivot projecting toward the center of the base plate and carrying at its inner end members which engage said central uniting member, and that portion of the lever which extends outwardly of its pivot overlying the outer portion of the handle and close enough to said handle that lever and handle may be simultaneously gripped in the hand of the user, and a stout helical spring encircling the pivot of the lever and having its ends bearing between lever and handle.

3. A structure as recited in claim 1 wherein said spring actuated member is in the form of an elongated lever that is pivoted intermediate its ends upon the upper side of the handle, that portion of said lever which lies inwardly of its pivot projecting toward the center of the base plate and carrying at its inner end members which engage said central uniting member, and that portion of the lever which extends outwardly of its pivot overlying the outer portion of the handle and close enough to said handle that lever and handle may be simultaneously gripped in the hand of the user, and a stout helical spring encircling the pivot of the lever and having its ends bearing between lever and handle, that portion of the lever which extends inwardly of the handle being composed of a pair of stout wires twisted together with their terminal inner ends flared apart, said uniting member comprising an upstanding element shaped to adapt it to be snapped into the flare presented by the inner end of said lever.

References Cited in the file of this patent

UNITED STATES PATENTS 2,115,928    Jay  ------------------- May 3, 1938

FOREIGN PATENTS 276,749    Great Britain ----------- Sept. 5, 1927